United States Patent [19]

Drogichen

[11] 4,138,738
[45] Feb. 6, 1979

[54] SELF-CONTAINED RELOCATABLE MEMORY SUBSYSTEM

[76] Inventor: Daniel P. Drogichen, B1 Magdalene House, 500 W. Rosedale Ave., West Chester, Pa. 19380

[21] Appl. No.: 927,559

[22] Filed: Jul. 24, 1978

[51] Int. Cl.² ............................................. G11C 17/00
[52] U.S. Cl. ........................................ 365/94; 365/49; 365/189
[58] Field of Search ...................... 365/49, 94, 95–105, 365/63, 189, 191, 226, 230

[56] References Cited

U.S. PATENT DOCUMENTS 3,644,906  2/1972  Weinberger ........................... 365/49

*Primary Examiner*—Terrell W. Fears
*Attorney, Agent, or Firm*—Mark T. Starr; Edmund M. Chung; Kevin R. Peterson

[57] ABSTRACT

An apparatus for use as part of a computer system's external memory for storing a subprogram used by the computer and modifying selected data words read from the apparatus prior to transmission to the computer. The apparatus includes an addressable read only memory (ROM) having a word size which is greater than the instruction word size used by the computer. The apparatus also includes a plurality of base registers which may be loaded under control of the computer's operating system program. The read only memory contains a softwave subprogram written assuming it is stored at an absolute location in the computer's memory system other than its actual location. Each ROM location contains one instruction or word of data and a plurality of non-data bits which may specify one of the plurality of base registers. As a word is read out of the ROM, a decoding circuit decodes the non-data bits to determine which, if any, of the base registers is specified. If a base register is specified, the decoding circuit triggers a gating circuit connected to the specified base register. The triggered gating circuit gates the contents of the specified base register into an adder, the other input to the adder coming from the data bits read from the ROM. The resulting data word, modified by the addition of the specified base register's contents, is fed into a driver circuit which transmits it to the computer. If no base register is specified by the non-data bits, the decoder circuit does not trigger any of the gating circuits, and a pattern of all zeros is provided as one input to the adder, the second input being the data bits read from the ROM. In such case, the resulting data word sent to the computer represents the unmodified data bits read out of the ROM.

27 Claims, 3 Drawing Figures

SELF-CONTAINED RELOCATABLE MEMORY SUBSYSTEM

CROSS-REFERENCE TO RELATED APPLICATION

Reference is hereby made to a U.S. Patent application entitled "Device for Automatic Modification of ROM Contents By A System Selected Variable", Ser. No. 920,557, by the same inventor as the instant invention, filed June 29, 1978, and assigned to the same assignee as the present application.

BACKGROUND OF THE INVENTION

The cost of microprocessors has dropped drastically due to the benefits of mass production. Contrary to the drop in the cost of microprocessor hardware, the cost of software to support these microprocessors has risen. This inconsistency in the cost of implementing microprocessor controlled apparatuses has hampered their proliferation.

One major reason for the high cost of microprocessor software stems from the fact that programming methods previously used with large computers are now being used in microprocessors. As an example, consider the system where portions of assemblers and compilers are loaded into read/write memory from an input/output device. Next, source language is read from one device while partly processed output is written on another. Subroutines are then read in from another device and addresses are relocated so that all code required to run a job fits together in memory with no wasted words between.

Although the latter approach to programming made sense in the early days of computers when memory was prohibitively expensive, memory costs have dropped drastically with read only memory currently being the cheapest kind and available in very small capacities. In addition, microprocessors are being utilized in many direct control environments which require no writing or rereading of data. Thus, in many cases, input/output devices are only required for program development.

It is almost universally true that mass production achieves low unit cost by turning out large sums of identical products. In the case of microprocessor programs which are often implemented in read only memories (ROMs), the obvious way of carrying out mass production is to manufacture large quantities of ROMs with identical contents. The drawback to this approach lies in the prevalent method of linking various pieces of software together into a complete software system, which requires many address changes in each segment. Thus, one factor that has prevented the mass distribution of modular computer programs implemented in ROM form is that often a program instruction must know the absolute location in the memory system of another instruction in the same subprogram, for example, for branching. Therefore, if a computer manufacturer wanted to offer a catalog of subprograms in ROM form, he would have to contend with the desire of different users to select various offerings and locate the selected offerings at different actual locations in memory. It would not be feasible for the manufacturer to assign each subprogram a unique location as the total available memory locations would rapidly be exhausted. What is needed then, is a way to modify the address portion of certain of the ROM'ed instructions before they are used as addresses by the microprocessor.

One solution to the problem presented lies in the use of base registers. Base registers provide a hardware facility that relocates addresses as needed during program execution, making it unnecessary to change them within the program.

In the prior art, base registers have been designed into the microprocessor's CPU chip or added on by the system builder. The apparatus described by John A. Carroll in "Solving Mass-Produced ROM Programming Problems With Base Registers", Computer Design, August, 1977, pp. 99, proposes a base register system for solving the problem presented. The Carroll apparatus includes a set of base registers, and adder/selector circuitry located functionally between the CPU's address bus lines and the memory system address bus lines. Several bits of the CPU's address bus are used to select a base register, which is added to the remaining bits to produce the memory system address.

Although the Carroll apparatus represents an advance over the prior art, it appears to have several drawbacks. First, since it is undesirable to require the CPU to massage the address read from program memory before issuing it on its address bus, the base register select bits must be precoded into the mass produced program ROM. Since a user application will most likely require the use of several base registers, the number of which will increase with the number of subprogram modules used in the system, each of the ROMs must provide a sufficient number of bits of base-register select information to accommodate the largest foreseeable programming system and this base register address is not alterable since it is ROM'ed. Hence, the situation is similar to the original problem experienced, with the branch register address space substituted for the memory system address space. Although this drawback could be overcome by swapping the base register contents before beginning operation with a subprogram which uses that branch register, such a routine is expensive in system program overhead. Alternatively, the branch register select portion of the address could be provided by special hardware in each system, but this would defeat the objective of a mass produced system.

The second drawback of the Carroll apparatus is that the hardware required to perform the address relocation is located at or within the CPU. That is, either the branch register array and select/adder circuitry must be located on a special chip or it must be on the CPU chip, which may be the most valuable silicon real estate in the system. In the latter case, the requirement that all of the branch registers that any user might need must be sold to all users would impose a significant drain on the logic available on the CPU chip. In either case, locating the branch register array and adder/selector centrally presents additional problems in the implementation of multiprocessor systems in which multiple CPUs, each performing different tasks at any one time, share common system address buses, data buses, and program memory.

A second solution to the problem presented lies in the implementation of a "jump relative" instruction as one member of the microprocessor's instruction set. Basically, a jump relative instruction is a branch instruction with the object of the branch specifying a positive or negative number of storage words. The microprocessor adds the object of the jump relative instruction to the storage address the jump relative instruction is located at to come up with the effective address to be branched to.

The main drawback of the jump relative instruction is that since it is ROM'ed, the object of the instruction cannot be altered. Hence, if a first subprogram located in a first ROM required the use of a second subprogram located in a second ROM, the memory system address space within which the second ROM was located would have to correspond to the effective address specified by the ROM'ed jump relative instruction. This would prevent the user from choosing from a catalog of ROM contained subprograms and locating the subprograms at any available location in the microprocessor's memory system he chose.

Further, the availability of a jump relative instruction would not compensate for the other benefits associated with a base register. A base register can be used to store the location of RAM workspace the subprogram requires for storing or manipulating data. A base register may also be used for storing personality constants which preselect some subset of the subprogram's capability or for providing the addresses of input/output devices.

Additionally, since the jump relative instruction would have to be implemented on the CPU chip, the logic required to implement the instruction might cause a drain on the limited space available on the CPU chip.

Another advance over the prior art is the device disclosed in a pending U.S. Patent application entitled "Device For Automatic Modification Of ROM Contents By A System Selected Variable", by the same inventor as the instant invention, filed June 29, 1978, and assigned to the same assignee as the present application. In the device disclosed in the latter mentioned application, the software utilized by a microprocessor is stored in a plurality of ROM packages connected to the microprocessor by an a-bit address bus, an n-bit bidirectional data bus and at least one control line. These ROM packages comprise the microprocessor's memory system and each is associated with a unique set of absolute system addresses.

Each ROM package includes a $2^a \times (N + 1)$ bit ROM where $2^a$ represents the number of $(n + 1)$ bit locations in the respective ROM. Each ROM package is used to store a sequence of n-bit program instructions which constitute a subprogram. Each instruction is stored in n bits of an $(n + 1)$ bit word. The $(n + 1)$st bit position is used to indicate whether the associated instruction contains a memory system address. Each subprogram is written assuming it is located starting at memory system address zero.

Also located in each ROM package is an n-bit base register, which is loaded under control of the operating system software with an offset address specifying the difference between the actual memory system address of the first addressable location in the associated ROM and the assumed memory system address.

When the microprocessor transmits a memory system address to the memory system, the ROM package corresponding to the specified memory system address receives the address and initiates a read cycle to its ROM. The $(n + 1)$ bit word addressed is read out of the ROM. The $(n + 1)$st bit read from the ROM is fed into a gating circuit contained on the ROM package. If the $(n + 1)$st bit is on the gating circuit gates the contents of the base register into one input of an n-bit adder also located on the ROM package, the second input to the adder coming from the first n bits of the $(n + 1)$ bits read out of the ROM. The adder adds the offset value to the address portion of the instruction read out of the ROM. A driver circuit, located on the ROM package and connected to the adder output, transmits the relocated program instruction to the microprocessor.

In the case when the $(n + 1)$st bit read from ROM is a zero, the gating circuit is turned off and the output of the gating circuit is n-bits of all zeros. In such case, the output of the adder is identical to the other input to the adder; viz., the first n bits of the $(n + 1)$ bit word read out of the ROM.

The limitation of the latter described device is that it contains only one base register. As a result, if the subprogram contained in a first ROM contains a branch to a second subprogram contained in a second ROM, the first subprogram must know the location of the second subprogram and this location is fixed since the branch instruction is ROM'ed. Although the first ROM could use its single base register to store the location of the second subprogram, this would require either sacrificing the ability to relocate addresses in the first subprogram or having the operating system program reload the base register with the address of the second subprogram prior to branching to it.

By including multiple base registers within each ROM package, additional capabilities beyond those available in a single base register ROM package are achieved. For example, the memory space address of other subprogram modules required by a first subprogram can be specified. Other uses for additional base registers include specifying the address of RAM workspace that the subprogram may require or storing personality constants which preselect some subset of the subprogram's capability or to provide the addresses of the input/output devices.

It is a general object of the present invention to eliminate these and other drawbacks of the prior art by providing an improved apparatus for relocating addresses as needed during program execution.

It is another object of the present invention to provide an apparatus for relocating program addresses by the addition of one of a plurality of system selected variables.

It is a further object of the present invention to provide a self-contained, mass-produced ROM based memory module for use as a computer's external memory, which allows a user to locate subprograms in any address space he desires without hardware customization.

These and other objects, features and advantages of the present invention will become more apparent from the detailed description of the preferred embodiment when read in conjunction with the drawings.

SUMMARY OF THE INVENTION

According to the invention, software subprograms utilized by a microprocessor are stored in a plurality of ROM packages connected to the microprocessor by an a-bit address bus, an n-bit bidirectional data bus and a plurality of control lines. These ROM packages comprise the microprocessor's external memory system and each is associated with a unique set of actual memory system addresses.

Each ROM package includes a ROM with a word size of $(n + d)$ bits, where n is the instruction word size used by the associated computer and d is at least 2. Each ROM package is used to store a sequence of n-bit program instructions which constitute a subprogram. Each instruction is stored in n bits of each $(n + d)$ bit word.

The remaining d bit positions in each word are used to specify one of a plurality of n-bit base registers also located on the ROM package.

Each base register is an n-bit read/write memory with a latched output, which may be loaded under control of the microprocessor's operating system software with the data to be stored transferred on the bidirectional data bus under control of one of the plurality of control lines.

When the microprocessor transmits a memory system address to the ROM package, a read cycle to the ROM is initiated. The $(n + d)$ bit word addressed is read out of the ROM. The $(n + 1)$st through $(n + d)$th bits read out of the ROM are fed to a decoder circuit also located on the ROM package. The decoder circuit decodes the d bits to determine which, if any, base register is specified. If a base register is specified, the decoder activates a gating circuit connected to the specified base register which gates the output of the specified base register into an OR network which combines the n-bit outputs of each gating circuit into one n-bit data path. The output of the OR network is fed as one set of inputs to an n-bit adder, the other set of inputs coming from the first n bits of the $(n + d)$ bits read out of the ROM. A driver circuit, located on the ROM package, transmits the adder output to the microprocessor on the bidirectional data bus.

In the case when the d bits read from the ROM do not specify one of the base registers, the decoder does not activate any of the gating circuits and hence the inputs to the OR network are all zeros. Hence, the OR network input to the adder is zero and the output of the adder represents the n bits fed into the other input to the adder.

BRIEF DESCRIPTION OF THE DRAWINGS

FIG. 3 is a figure showing the operation of the decoder of FIG. 2.

DETAILED DESCRIPTION OF THE PREFERRED EMBODIMENT

Figure 1:
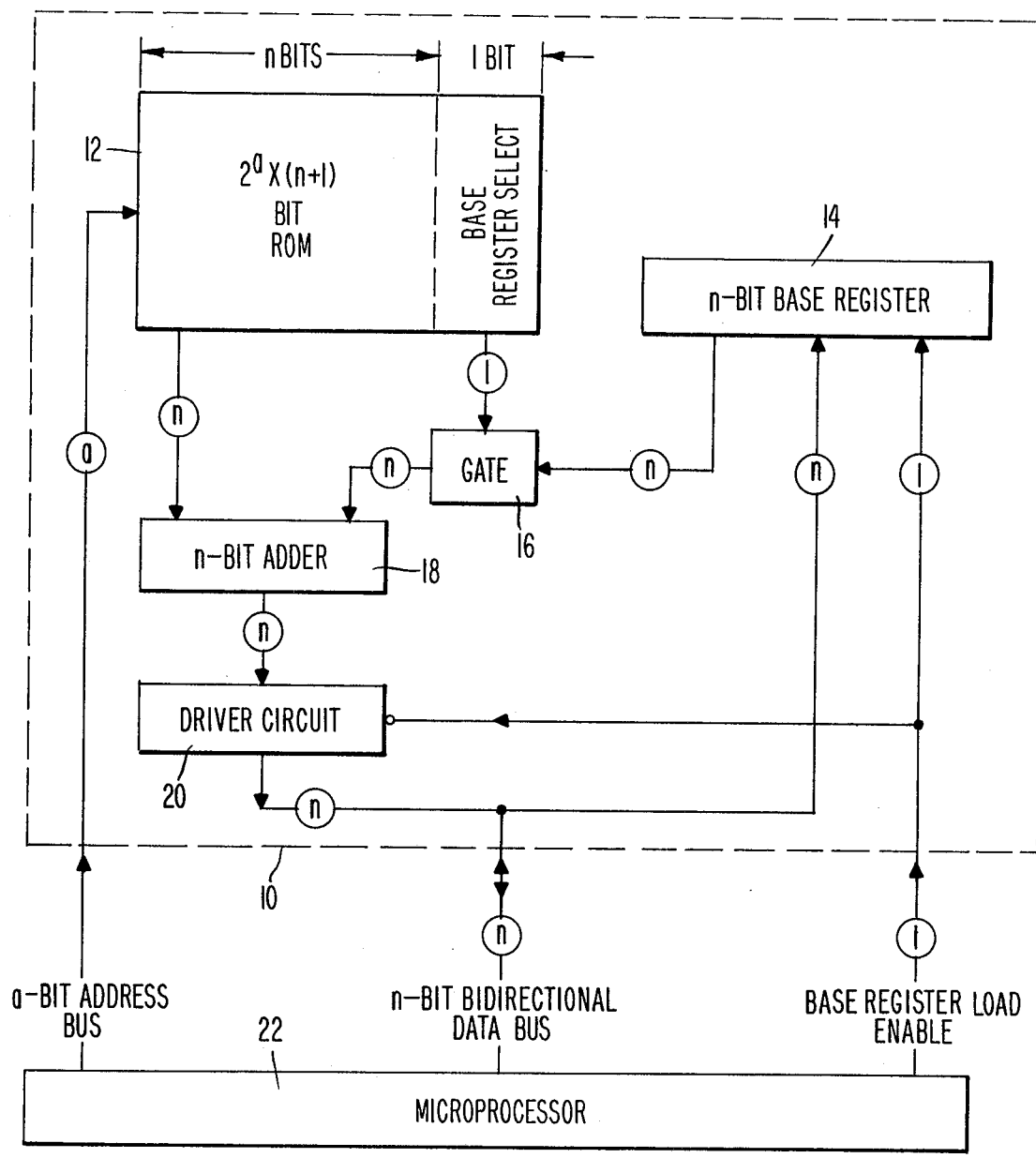
FIG. 1 is a block diagram of an external memory device including a single base register.

The use of standard software in computer programming serves to relieve the programmer of reprogramming a computer from scratch. Among the typical types of standard software subprograms are language translators to translate programming languages into the computer's own internal machine code, and subroutine libraries which represent sets of off-the-shelf program fragments that perform commonly required functions.

A typical subroutine includes internal jumps and external references. Before using a subroutine, a number of actual machine addresses must be inserted in the jump instructions and external references. The normal method of doing this is to read the routine into an available area in read/write memory under control of a relocation loader program which keeps track of where in memory everything is and calculates actual addresses needed in various instructions.

By putting all standard software into read only memory (ROM), many practical benefits are achieved. For instance, most of the data-juggling programming can be inside subroutines, leaving only a relatively small application oriented program to direct the whole task. Thus, most software could be selected from a catalog of standard factory programmed ROMs, and just plugged in. Using this technique, only a small portion of the system needs to be stored in custom ROM, with the majority of the system in standard mass-produced ROM.

The problem confronted in using ROMs to store standard subroutines is that nothing in the programmed ROM can be changed to make all parts of a software system fit together. At the same time however, many addresses in a program, particularly in jump instructions, assume a knowledge of where in memory each program is located. Each subroutine cannot be permanently assigned to a particular block of space since the whole catalog of software available for a particular computer would rapidly exceed the maximum amount of memory its address word could handle. Further, even if that were possible, many data manipulation subroutines must be informed each time they are called just where their data is, so that even if software can be relocated for each system and custom ROMs could be fabricated cheaply, the fact that external references change while the program is running interferes with a software solution.

The present invention employs base registers to provide a hardware method of modifying addresses and data at run time while leaving the programs unchanged. A base register is a hardware device that stores an address word, called a base or offset. In accordance with the present invention, one of a plurality of bases can be added automatically to the address of an instruction or data field after the instruction is read out of memory, but before it is sent to the computer.

The capability of offsetting addresses read out of ROM enables any block of code to be written as if it began at address zero, and the ROM to be wired so that the code can appear anywhere in the computer's memory system. As long as the subroutine's actual address origin is placed in a base register before execution and the program calling the subroutine knows the actual starting address of the subroutine, instructions within the program can refer to each other correctly. This method makes it possible to manufacture large numbers of ROM copies of programs, subprograms or subroutines, all alike, without knowing what address space will be assigned to them in different systems.

FIG. 1 illustrates a ROM package including a single base register. The device illustrated and the following description of the single base register device is based on the disclosure made in a pending U.S. Patent application entitled "Device For Automatic Modification Of ROM Contents By A System Selected Variable", filed June 29, 1978, by the same inventor as the instant invention and assigned to the same assignee as the present application. The present application specifically incorporates the disclosure made in the latter mentioned application.

Referring now to FIG. 1, the ROM package 10 includes all of the hardware necessary to automatically modify the ROM 12 contents by the addition of an offset. The device is intended to be used as a part of or as the entire memory system attached to a microprocessor 22 and can be used with most commonly available microprocessors 22 whose characteristics include an n-bit instruction format, an a-bit memory address bus, an n-bit bidirectional data bus and the ability to activate at least one external control line.

The ROM 12 itself is a standard product with a word size of $(n + 1)$, where n is the word size utilized by the microprocessor 22, and a storage capacity of $2^a$ words where $2^a$ is the number of addressable locations available with an a-bit address. Thus, for use with a typical microprocessor 22 having a 3-byte machine instruction, the ROM 12 word size would be 25 bits. Of these 25 bits, n (=24) bits are used to store the 3-byte machine instruction and the 25th bit is used to indicate a base register select condition, the meaning of which will be explained below. The microprocessor 22 transmits the memory system address to the ROM package 10 over the a-bit address bus. The ROM 12 includes circuitry to decode the address received from the microprocessor 22, the design of this address decoding circuitry being well known to those skilled in the art.

Also located within the ROM package 10 is an n-bit base register 14, which in the latter example would be 24 bits wide. In the device disclosed, the base register 14 is a static read/write memory element with a latched output. However, it will be obvious to those skilled in the art that alternate memory devices, such as a dynamic memory chip, could be utilized. The base register 14 receives the data to be stored in it over the n-bit bidirectional data bus connecting the ROM package 10 with the microprocessor 22. The data on the bidirectional data bus is stored in the base register 14 when the base register load enable input is strobed by the microprocessor 22.

The n bit output of the base register 14 is connected to gate 16, which is also located on the ROM package 10. The other input to gate 16 is from the base register select bit position of ROM 12. Gate 16 may be of a standard design such as one comprising n two legged AND circuits, with the base register select bit output of ROM 12 providing one input to each of the n AND circuits and each of the n outputs of base register 14 providing the second input to one of the n AND circuits, respectively.

The n bit output of gate 16 serves as one set of inputs to the n-bit adder 18, which is also located on the ROM package 10. The other set of inputs to the adder 18 is the n data bit outputs of ROM 12. The n-bit output of adder 18 is fed into driver circuit 20 which redrives the output of the adder 18 and transmits it onto the n-bit bidirectional data bus. This bus provides the data link between the ROM package 10 and the microprocessor 22.

The driver circuit 20 is controlled by the base register load enable signal. When the latter signal is sent by the microprocessor 22, the driver circuit 20 is put in a high impedance state which is effective to turn it off. This prevents the driver circuit 20 output from interfering with data on the n-bit bidirectional data bus when the base register 14 is being loaded.

Various microprocessors 22 requiring an external memory may be utilized with the device. Typical of such microprocessors 22 are the Intel 8080 and the Motorola 6800. However, those skilled in the art will realize that similar embodiments of the device can be adapted for use with most digital computers. The requirements for the microprocessor 22 are that it address external memory over an a-bit address bus and transfer data to and from external memory on an n-bit bidirectional data bus. In addition, the selected microprocessor 22 must be capable of providing the base register load enable signal to the ROM package 10.

The following explanation describes the operation of the device when employed in conjunction with a microprocessor 22. It will be assumed that only one ROM package 10 is connected to the microprocessor 22 and that it contains a subprogram which will be used by the microprocessor 22. The microprocessor 22 is initially powered on and its operating system program (which is not stored in the ROM package 10) is put in control. The operating system program must then load the base register 14 with the offset (which is the actual memory system address corresponding to the first addressable location in the ROM package 10 containing the subprogram). The microprocessor 22 accomplishes this by transmitting the address or data to be stored in the base register 14 on the n-bit bidirectional data bus going to ROM package 10 and activating the base register select line for ROM package 10. The microprocessor 22 software and hardware to accomplish this will be obvious to those skilled in the art. The base register load enable signal turns off driver circuit 20 so that no extraneous data is placed on the bidirectional data bus from the driver circuit 20 output. The data from the microprocessor 22 is read into the base register 14 by the base register load enable signal initiating a store operation in the base register 14.

Once the base register 14 is loaded, the operating system program, or any program calling the subprogram stored in the ROM package 10, need only know the actual memory system starting address of the subroutine, this address normally being the value stored in the base register 14. The subprogram stored in the ROM package 10 is written assuming the subprogram is located starting at address O.

The ROM 12 word size is $(n + 1)$ bits where n is the instruction size used by the associated microprocessor 22. The extra base register select bit associated with each n-bit word is used to designate whether an address stored in the corresponding n bit word requires relocation. For example, if the n-bit word specifies data rather than an address, or specifies a register to register instruction, since no addresses are involved in using the data or executing the instruction, respectively, relocation normally is not necessary and the base register select bit associated with the data or instruction would be a zero. On the other hand, if the n-bit word specifies a branch within the subroutine or references the location of data within the subroutine, the address specified in the n-bit word must be relocated to reflect the actual memory system address of the object of the branch instruction or the location of the data, respectively, rather than the address stored in the ROM 12. In such case, the base register select bit associated with the corresponding n-bit word would be a one. It should be noted that the base register select bit associated with each $(n + 1)$ bit ROM word is precoded in the ROM 12 when it is burned by the manufacturer, the on/off state of each base register select bit being determined by whether the associated n bit data word contains an address requiring relocation.

Thus, assuming the base register 14 located in ROM package 10 has been loaded by the operating system program with the offset address, the following occurs when the microprocessor 22 initiates a read operation from the ROM package 10. The microprocessor 22 sends the actual address it wants to read to the ROM package 10 over the a-bit address bus. This initiates a read to the ROM 12 location specified and $(n + 1)$ bits are read out of the ROM 12. If the base register select bit (that is, the $(n + 1)$st bit) read out of ROM 12 is a zero, then gate 15 receives a zero input from the ROM 12, the gate 16 is turned off due to the base register select bit being zero and the n-bit output of gate 16 is all zeros. Hence the n-bit adder 18 receives as inputs the high order n-bits of data read from ROM 12 and n-bits of zeros from the gate 16. The output of the n-bit adder 18 is identical to the input from ROM 12 since the second input from the gate 16 is all zeros. The n-bit output of adder 18 is inputted to driver circuit 20 where it is redriven onto the n-bit bidirectional data bus going to the microprocessor 22. Thus, in this case, the data sent to the microprocessor 22 is exactly as it was stored in ROM 12; viz., it has not been relocated.

If the base register select bit read out of the ROM 12 is a one, the following will occur. The gate 16 will be enabled due to the base register select bit being a one. With the gate 16 enabled, the clamped n-bit output of base register 14 will be gated through gate 16 and inputted to adder 18, the other input to adder 18 being the high order n-bits of data read out of ROM 12. The adder 18 will add the offset received from gate 16 to the data word read out of ROM 12. The modified n-bit data word read out of adder 18 is fed into driver 20 where it is redriven onto the n-bit bidirectional data bus going to the microprocessor 22. Thus, in this case the data sent to the microprocessor 22 contains a relocated address corresponding to an actual addressable location in ROM 12.

The device as described allows a manufacturer to sell a subprogram software module in ROM package 10 form to a user, and the user is free to locate the ROM package 10 at any actual location in his memory system. No additional hardware is required in the user's system since all hardware necessary to relocate the addresses specified in the ROM 12 containing the subprogram is located within the ROM package 10 the user purchases. Further, only minimum software overhead is expended since once the user initializes the base register 14 with the offset value for his system, address relocation is performed automatically with no requirements on the part of system hardware or software.

Figure 2:
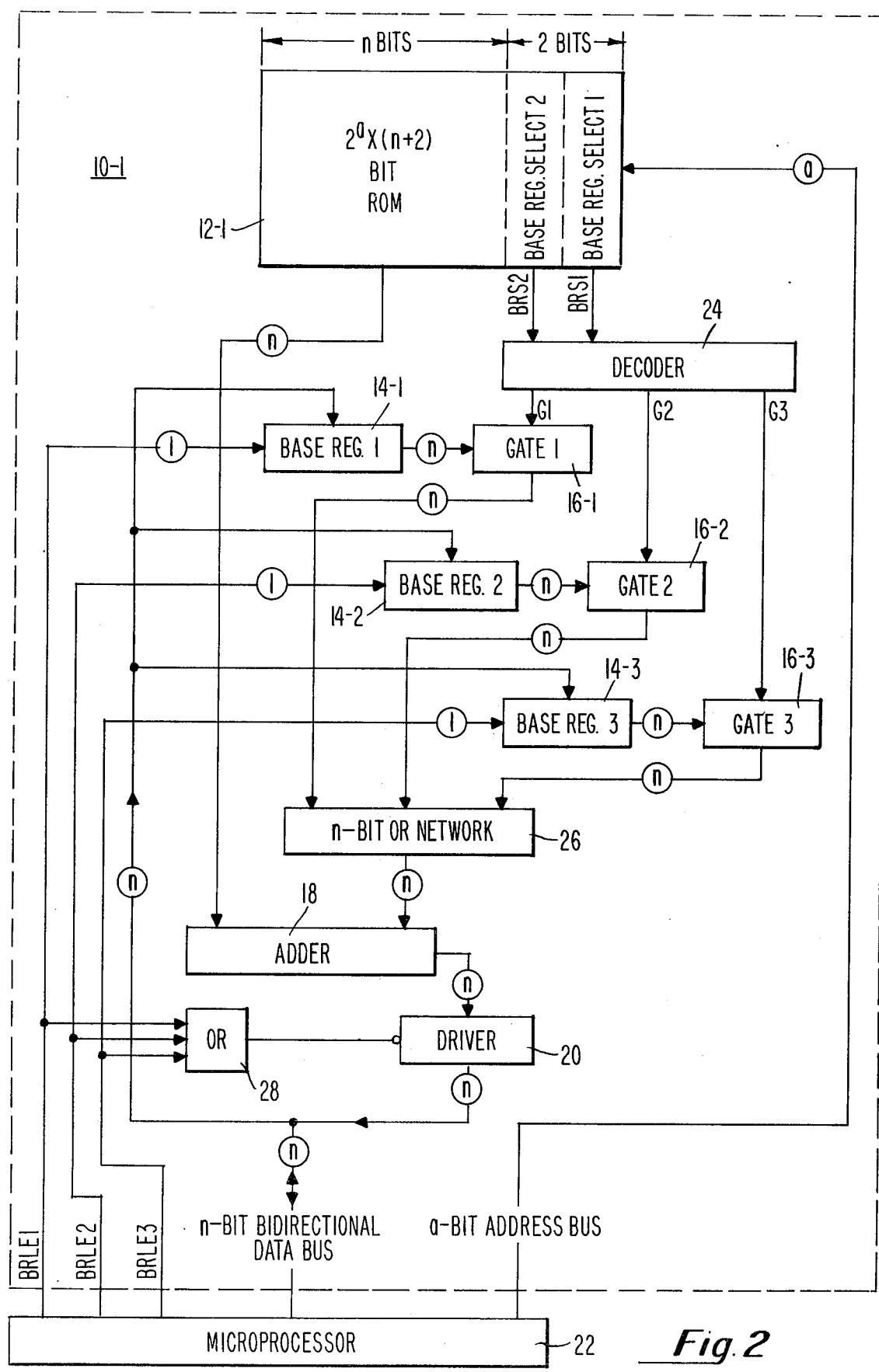
FIG. 2 is a block diagram of the preferred embodiment of the present invention connected to a microprocessor.

Referring now to FIG. 2, the preferred embodiment of the present invention is shown. The present invention is an improvement of the single base register device previously described. The improved apparatus includes multiple base registers within each ROM package 10-1 in order to extend the capabilities of the single base register device.

The preferred embodiment of the improved apparatus includes three base registers 14-1, 2, 3, although those skilled in the art will realize that the preferred embodiment may be modified to include more than three base registers. In the preferred embodiment, the word size of the ROM 12-1 is $(n + 2)$ bits, with the high order n bits of each word used to store the instruction (or an n-bit data word) and the low order two bits used to specify whether the associated n-bit data word is to be offset by the contents of base register 1, 2 or 3 or whether no offset is to be applied to the associated n-bit data word.

The base register select bits included as the two low order bits in each $(n + 2)$ bit ROM 12-1 word are assigned the following meanings. If neither base register select bit 1 (BRS1) or base register select bit 2 (BRS2) is on, the associated n-bit data word is not to be offset. If BRS1 is a one and BRS2 is a zero, the associated n-bit data word is to be offset by the value contained in base register 1. If BRS1 is zero and BRS2 is one, the associated n-bit data word is to be offset by the value contained in base register 2. Finally, if both BRS1 and BRS2 are one, the associated n-bit data word is to be offset by the value contained in base register 3.

The base registers 14-1, 2, 3 are loaded by the microprocessor 22 transmitting the offset value to be stored on the n-bit bidirectional data bus and activating the BRLE1, BRLE2 or BRLE3 control line depending on whether the offset value is to be stored in base register 1, 2 or 3, respectively. The three base register load enable signals BRLE1, 2, 3 are all fed into OR circuit 28, so that when any one of the base registers 14-1, 2 or 3 is being loaded, the output of OR circuit 28 will be active, which is effective to turn off driver circuit 20, the operation of driver circuit 20 having been described previously in the discussion of the single base register device. This prevents the driver circuit 20 from interfering with the offset value being transmitted to a base register 14-1, 2 or 3 over the bidirectional data bus.

Assuming the operating system program has stored the offset values in the three base registers 14-1, 2, 3, the apparatus functions as follows. A read operation is initiated by the microprocessor 22 transmitting the desired memory system address to the ROM package 10-1 over the a-bit address bus. The a-bit address transmitted is received by the ROM 12-1 and the $(n + 2)$ bit word addressed is read out of the ROM 12-1. The two low order bits BRS1, BRS2 read out of the ROM 12-1 are inputted to decoder 24.

Decoder 24 decodes the base register select bits BRS1, BRS2 to determine which, if any, base register 14-1, 2, 3 value the high order n-bits read out of ROM 12-1 are to be offset by. FIG. 5 shows the operation of decoder 24 in tabular format. The logic required to implement the decoder will be obvious to those skilled in the art. The outputs of the decoder 24, G1, G2 and G3 indicate whether the contents of base register 1, 2 or 3, respectively, is to be used as the offset value or (if neither the G1, G2 or G3 outputs are active) whether the n-high order bits read out of ROM 12-1 are not to be offset.

Assume for example that the G1 output of decoder 24 is active. The G1 output of decoder 24 is connected to the gating input of gate 16-1 and causes the contents of base register 1 to be gated through gate 1 and into OR circuit 26. The details of the gate 16-1 operation were described previously in the discussion of the single base register device. Since the G2 and G3 inputs to gates 16-2 and 16-3, respectively, are inactive, the n-bit outputs of these gates 16-2, 3 will be zero.

The n-bit outputs of each of the three gating circuits 16-1, 16-2 and 16-3, are fed into n-bit OR network 26. The OR network 26 may, for example, include n three input OR circuits, one input coming from each corresponding bit position of the n-bit outputs of gates 1, 2 and 3. The OR network 26 serves to condense the three n-bit data paths out of gates 1, 2 and 3 into one n-bit data path and since only one of the three n-bit outputs of gates 1, 2 and 3 may be active at any one time, the n-bit output of OR network 26 corresponds to the n-bit output of the active gate 16-1, 2 or 3.

The operation of the ROM package 10-1 when either the G2 or G3 output of decoder 24 is active and the G1 output is inactive is analogous with the operation described for an active G1 output. When neither the G1, G2 or G3 outputs of decoder 24 is active, neither gates 1, 2 or 3 is enabled and three all zero n-bit sets of inputs are fed into OR network 26. In such case, the n-bit output of OR network 26 is all zeros, which follows from the fact that no offset was specified by the base register select bits BRS1, BRS2.

At this point, the n-bit output of OR network 26 represents the contents of the selected register 1, 2 or 3, or all zeros if no base register 14-1, 2, or 3 was specified in the two low order bits, BRS1, BRS2 read out of ROM 12-1.

The inputs to adder 18 consist of the n-bit data word read out of the n-high order bits of ROM 12-1 and the output of OR network 26. The output of adder 18 represents the n-bit data word read out of ROM 12-1 offset by the contents of the specified base register, if one was specified. This output is transmitted to the microprocessor 22 over the n-bit bidirectional data bus, as explained previously in the discussion of the single base register device.

By including multiple base registers 14-1, 2, 3 within each ROM package 10-1, additional capabilities beyond those described for the single base register device are achieved. For example, the memory address space of other subprogram modules required by a first subprogram can be specified. Other uses for the additional base registers 14-1, 2, 3 include specifying the address of RAM workspace that the subprogram may require, or storing personality constants which preselect some subset of the subprogram's capability or to provide the addresses of input/output devices.

Although the preferred embodiment of the present invention considered a ROM package 10-1 including only three base registers 14-1, 2, 3, those skilled in the art will realize that this embodiment can be modified to include more than three base registers 14 on each ROM package 10-1. Further, those skilled in the art will realize that the n-bit address bus could be used to specify which base register 14-1, 2 or 3 is to be loaded rather than using discrete base register load enable lines BRLE1, 2, 3 as in the preferred embodiment.

Having shown and described the preferred embodiment of the present invention, those skilled in the art will realize that various omissions, substitutions and changes in forms and details of the present invention may be made without departing from the spirit of the invention. It is the intention, therefore, to be limited only as indicated by the scope of the following claims.

What is claimed is:

1. A self-contained relocatable memory system for use with a digital microprocessor, said digital microprocessor providing an a-bit address bus for specifying an address corresponding to a location to be read from said memory system, an n-bit bidirectional data bus for transferring data between said microprocessor and said memory system and a plurality of control signals for controlling the transfer of n-bit data constants from said microprocessor to said memory device, said microprocessor characterized as having an n-bit instruction format, said memory system comprising:
   an addressable memory connected to said address bus;
   a plurality of base registers connected to said bidirectional data bus;
   a plurality of gating means, each of said gating means connected to one of said plurality of base registers, each of gating means for gating the contents of its connected base register;
   decoder means connected between said addressable memory and each of said plurality of gating means and responsive to data patterns from said addressable memory, for selectively activating one of said plurality of gating means;
   OR network means connected to each of said plurality of gating means for transmitting the output of said activated gating means;
   an adder connected to said addressable memory and said OR network means; and
   driver means connected to the output of said adder and said bidirectional data bus for transmitting the output of said adder to said microprocessor.

2. The memory system in accordance with claim 1 wherein each of said base registers, in response to the receipt of one of said plurality of control signals, will store the data on said bidirectional data bus.

3. The memory system in accordance with claim 2 wherein each of said base registers is a read/write storage device.

4. The memory system in accordance with claim 3 wherein each of said base registers is further characterized as being a static memory device with a latched output.

5. The memory system in accordance with claim 2 further including means, responsive to the receipt of at least one of said control signals, for turning off the output of said driver means.

6. The memory system in accordance with claim 5 wherein said addressable memory is a read only memory.

7. The memory system in accordance with claim 6 wherein each of said base registers is further characterized as having a latched output.

8. The memory system in accordance with claim 2 or 7 wherein said OR network means includes a number of OR circuits equal to the number of bit positions contained in each of said base registers, each of said OR circuits including a number of inputs equal to the number of said base registers.

9. The memory system in accordance with claim 8 wherein the corresponding output bit position of each of said gating means is connected as an input to one of said OR circuits.

10. The memory system in accordance with claim 9 wherein each of said base registers is further characterized as a static memory.

11. The memory system in accordance with claim 5 wherein:
   said addressable memory is further characterized as having a storage word size of $n + d$ bits length, where $d$ is at least equal to 2;
   said addressable memory is responsive to an a bit address; and
   each of said base registers includes means for storing n bits of data.

12. The memory system in accordance with claim 11 wherein said decoder means is further characterized as being connected to d output bits of said addressable memory.

13. The memory system in accordance with claim 12 further characterized in that said decoder means, in response to the receipt of specified d bit data patterns from said addressable memory, will activate one of said plurality of gating means.

14. The memory system in accordance with claim 13 further characterized in that the input to said adder from said addressable memory includes n bits of the output of said addressable memory.

15. The memory system in accordance with claim 14 further characterized in that the data paths between each of said gating means and said OR network is n bits wide.

16. The memory system in accordance with claim 14 wherein said adder is further characterized as an n-bit adder.

17. A self-contained relocatable memory system comprising:
- an addressable memory;
- a plurality of base registers;
- a plurality of gating means, each of said gating means connected to one of said plurality of base registers, each of said gating means for gating the contents of its connected base register;
- decoder means connected between said addressable memory and each of said plurality of gating means and responsive to data patterns from said addressable memory, for selectively activating one of said plurality of gating means;
- OR network means connected to said plurality of gating means for transmitting the output of said activated gating means; and
- an adder connected to said addressable memory and said OR network means.

18. The memory system in accordance with claim 17 further comprising driver means connected to the output of said adder for transmitting the output of said adder.

19. The memory system in accordance with claim 18 wherein each of said base registers includes a read/write storage device.

20. The memory system in accordance with claim 19 further including means, responsive to the writing of data in one of said plurality of base registers, for turning off the output of said driver means.

21. The memory system in accordance with claim 17 wherein said addressable memory is a read only memory.

22. The memory system in accordance with claim 21 wherein each of said base registers is further characterized as having a latched output.

23. The memory system in accordance with claim 22 wherein each of said base registers is further characterized as a static memory device.

24. The memory system in accordance with claim 16 or 20 or 21 wherein said OR network means includes a number of OR circuits equal to the number of bit positions contained in each of said base registers, each of said OR circuits including a number of inputs equal to the number of said base registers.

25. The memory system in accordance with claim 24 wherein the corresponding output bit position of each of said gating means is connected as an input to one of said OR circuits.

26. The memory system in accordance with claim 25 wherein said adder is further characterized as an n-bit adder.

27. A self-contained relocatable memory system for use with a digital microprocessor, said digital microprocessor providing an a-bit address bus for specifying an address corresponding to a location to be read from said memory system, an n-bit bidirectional data bus for transferring data between said microprocessor and said memory system and a plurality of control signals for controlling the transfer of n-bit data constants from said microprocessor to said memory device, said microprocessor characterized by having an n-bit instruction format, said memory system comprising:
- an addressable read only memory connected to said address bus, said addressable memory responsive to an a-bit address, said addressable memory characterized as having a storage word size of $n + d$ bits length, where d is at least equal to 2;
- a plurality of base registers connected to said bidirectional data bus, wherein each of said base registers is a read/write storage device with a latched output, and further wherein each of said base registers in response to the receipt of one of said plurality of control signals will store the n-bits of data on said bidirectional data bus;
- a plurality of gating means, each of said gating means connected to one of said plurality of base registers, each of said gating means for gating the contents of its connected base register;
- decoder means connected between d output bits of said addressable memory and each of said plurality of gating means and responsive to data patterns from said addressable memory, for selectively activating one of said plurality of gating means;
- OR network means connected to each of said plurality of gating means for transmitting the output of said activated gating means, said OR network means including a number of OR circuits equal to the number of bit positions contained in each of said base registers, each of said OR circuits including a number of inputs equal to the number of said base registers, wherein the corresponding output bit position of each of said gating means is connected as an input to one of said OR circuits;
- an n-bit adder, said adder receiving one set of inputs from the n output bits of said addressable memory and a second set of inputs from said OR network means;
- driver means connected to the output of said adder and said bidirectional data bus for transmitting the output of said adder to said microprocessor; and
- means responsive to the receipt of at least one of said control signals for turning off the output of said driver means.

* * * * *

UNITED STATES PATENT AND TRADEMARK OFFICE
CERTIFICATE OF CORRECTION

PATENT NO. : 4,138,738
DATED : February 6, 1979
INVENTOR(S) : Daniel P. Drogichen It is certified that error appears in the above-identified patent and that said Letters Patent are hereby corrected as shown below:

Title/Abstract page insert:

--Assignee: BURROUGHS CORPORATION,
            Detroit, Michigan --

Title/Abstract page, right hand column, line 4, change "softwave" to --software--.

At column 10, line 31, change "FIG. 5" to --FIG. 3--.

Signed and Sealed this

Fifteenth Day of May 1979

[SEAL]

Attest:

RUTH C. MASON
Attesting Officer

DONALD W. BANNER
Commissioner of Patents and Trademarks